United States Patent
Piantedosi

[11] Patent Number: 5,419,014
[45] Date of Patent: May 30, 1995

[54] EXTENDED SLEEVELET GLOVES

[76] Inventor: Francesca Piantedosi, 400 Washington St. (D3), Middletown, Conn. 06457

[21] Appl. No.: 261,942
[22] Filed: Jun. 17, 1994
[51] Int. Cl.⁶ ............................................. A47L 13/18
[52] U.S. Cl. .................... 15/227; 15/104.94; 2/161.8; 264/297.2
[58] Field of Search ................ 15/227, 104.94; 2/159, 2/161.8

[56] References Cited

U.S. PATENT DOCUMENTS

| | | | |
|---|---|---|---|
| 1,559,114 | 10/1925 | Maranville | 15/227 |
| 2,187,430 | 1/1940 | Olmsted | 15/227 |
| 2,745,128 | 5/1956 | Zeuner | 15/227 |
| 3,151,333 | 10/1964 | Scholz | 2/161 |
| 3,643,386 | 2/1972 | Grzyll | 51/391 |
| 4,038,787 | 8/1977 | Bianchi | 51/391 |
| 4,107,840 | 8/1978 | Kupperman et al. | 30/172 |
| 4,621,388 | 11/1986 | Ortolivo | 15/227 |

FOREIGN PATENT DOCUMENTS 916787  8/1954  Germany ................ 15/227

*Primary Examiner*—Edward L. Roberts, Jr.
*Attorney, Agent, or Firm*—Charles Blaich

[57] ABSTRACT

A waterproof flexible glove with extended sleevelet with releasably lockable cuff fastenable to a shirt or blouse sleeve, having reservoirs on the fingers and palm which act to retain cleansing solutions by the surface tension of the cleansing solutions and methods of manufacture.

9 Claims, 1 Drawing Sheet

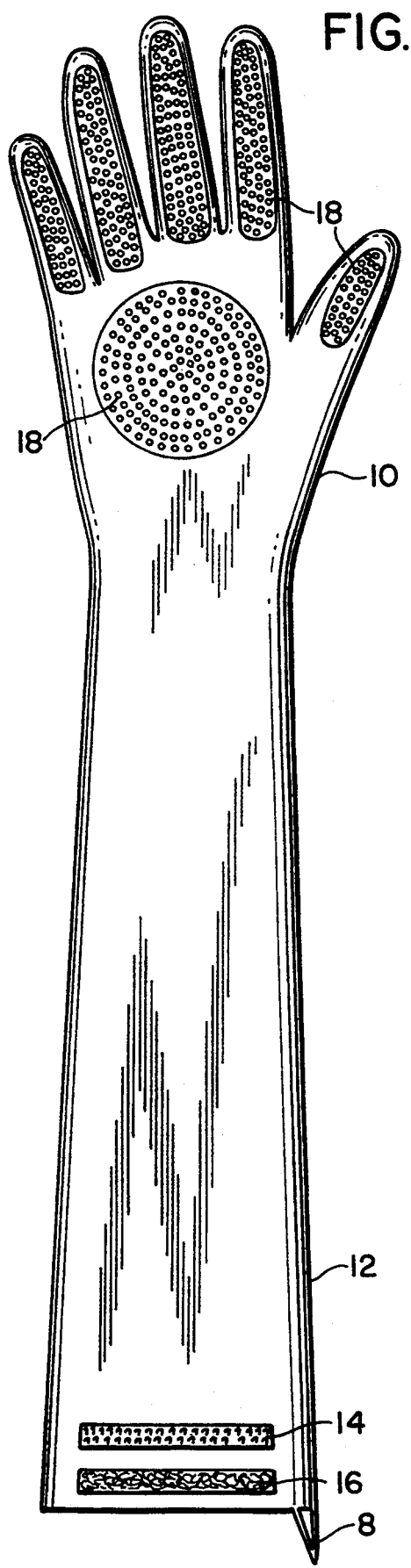
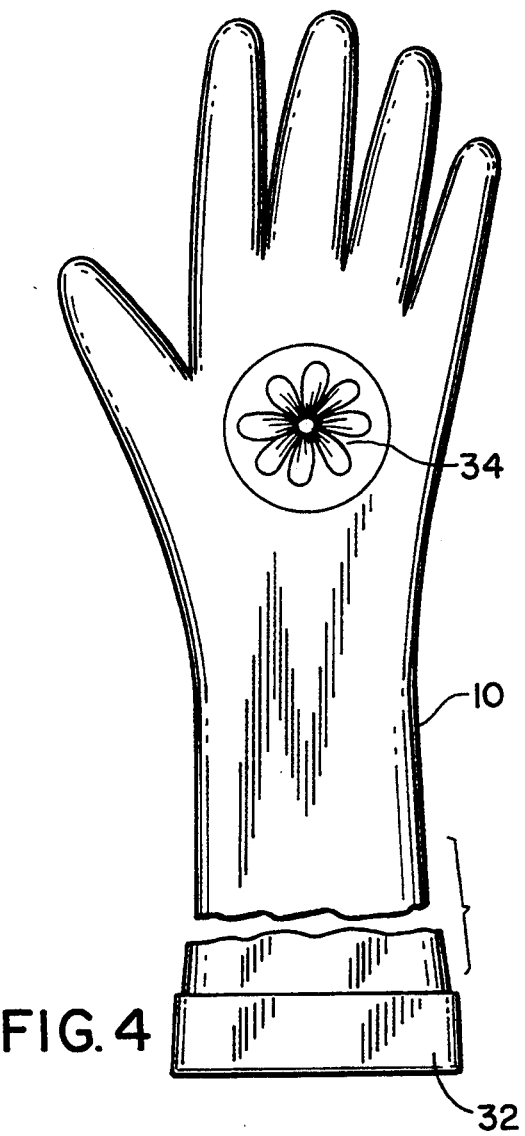
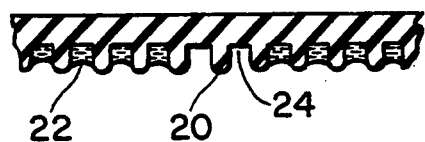
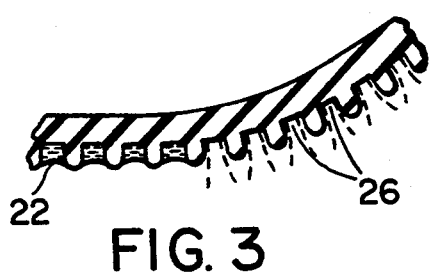

EXTENDED SLEEVELET GLOVES

BACKGROUND OF THE INVENTION

Many waterproof gloves and mittens have been devised to protect the wearer's hands from harsh cleaning solutions and the like. Many have incorporated embossed roughness or abrasives in their designs to reduce slippage and to facilitate cleansing and scouring. Some have abrasives and scrapers incorporated into their design to facilitate the removal of vegetable or fruit skins without the need for hand held vegetable knives. Some have cuffs to catch drippings when the hands are raised.

Manufacturing methods vary, but it seems that all incorporate at least one separate operation to affix the abrasive material to the glove regardless of the location. None of these gloves of the prior art appear to incorporate all of the desired qualities including low cost manufacture which is required for commercial success.

OBJECT OF THE INVENTION

It is an important object of the invention to provide a flexible waterproof glove which incorporates devices to retain cleansing solutions by surface tension.

It is another important object of the invention to provide a flexible waterproof glove which incorporates devices to aid in the removal of embedded dirt on articles with a chafing or rubbing action.

It is another important object of the invention to provide a flexible waterproof glove which incorporates a sleevelet which extends over the elbows of the wearer.

It is another important object of the invention to provide a flexible waterproof glove which incorporates a means to affix the extended sleevelet to a sleeved shirt or blouse of the wearer.

It is another important object of the invention to provide a flexible waterproof glove which incorporates a means to form a releasably fastenable cuff at the upper extremity of its sleevelet.

It is another important object of the invention to provide a flexible waterproof glove which incorporates a simple hanging means extending from the upper extremity of the sleevelet to permit complete drainage of cleansing solutions and the like.

It is another important object of the invention to provide low cost manufacturing processes to provide a waterproof glove with an extended sleevelet which incorporates devices to remove embedded dirt on articles with a chafing or rubbing action and to act as reservoirs for the cleansing solutions by surface tension.

PRIOR ART

A preliminary search for patentability provided the following prior art:

| Patent Number | Date | Inventor(s) |
| --- | --- | --- |
| 2,745,128 | May 15, 1956 | Zeuner |
| 3,151,333 | October 6, 1964 | Scholz |
| 3,643,386 | February 22, 1972 | Grzyll |
| 4,038,787 | August 2, 1977 | Bianchi |
| 4,107,840 | August 22, 1978 | Kupperman et al. |
| 4,621,388 | November 11, 1986 | Ortolivo |

Zeuner discloses a glove or mitten having a soft sponge rubber element secured in an opening therein with the sponge rubber element mounted to be positioned in the palm of a hand when the glove is worn.

Scholz relates to a glove or mitten with an abrasive surface for use in peeling foods and the like. The abrasive surface generally covers the palm of the hand, the insides of the fingers and the thumb.

Grzyll teaches hand apparel having abrasive material at effective working areas to afford cleaning and abrading contact with an object while providing various advantages to the user.

Bianchi is a glove with a flexible body with a plurality of discrete abrading units to permit free flexing of the fingers, thumb and palm. The abrading units are a plurality of hard and sharp particles dispersed in an adhesive and are held in place by waterproof adhesive.

Kupperman et al. relates to a glove with a flexible two-piece body with a plurality of discrete abrading units disposed on the body to permit free flexing thereof. The two piece glove is secured together by heat sealing and the abrading units are heat sealed to the front piece of the body.

Ortolivo is a waterproof scouring glove.

None of the prior art either individually or in combination appears to disclose the art of the instant invention.

SUMMARY OF THE INVENTION

The present invention is a flexible, waterproof glove with an extended sleevelet which extends over the elbow to mid-upper arm of the wearer. The palm and inner finger areas of the glove have areas which are covered with molded or formed 0.125 inch (3.2 mm) long and 0.0625 inch (1.6 mm) inch diameter teats or nibs which are located in symmetrically spacial arrangement in 0.03125 inch (0.08 mm) or closer proximity to each other to provide a reservoir for the retention of cleaning solutions which by wetting the surfaces of the teats forming menisci between symmetrically spacially related teats, thus storing the cleansing solution by the surface tension of the cleansing solution. When pressed against a to be cleansed surface, the symmetrical spacial relationship of the teats to each other is disturbed breaking the menisci causing the cleansing solution to be released for cleansing. The uppermost outer portion of the extended glove sleevelet has releasable hook and loop fastening means affixed.

The loop portion is affixed immediately at the uppermost outer edge of the sleevelet. The hook portion is affixed on the outer side of the sleevelet approximately 1½ inch (3.81 cm) from the uppermost edge in alignment with the loop portion so that when the uppermost edge is folded to form a locked but releasable cuff the hook and loop fastening means interlock to prevent the cuff from unrolling. In the instance where it is desirable to fasten the extended glove sleevelet to a shirt or blouse sleeve, a hook portion of a hook and loop fastening means may conveniently be affixed directly underneath and on the inside of the extended glove sleevelet at its uppermost edge. The wearer's sleeve has the hook portion of the hook and loop fastening means affixed on the outside of the shirt or blouse so that the two portions may be interlocked to attach the extended glove sleeve to the shirt or blouse as is well known in the art.

The glove, extended sleevelet and cleansing solution reservoir teats or nibs may conveniently be manufactured by dipping a glove shaped mold which has the teat pattern cut into its surface into a flexible vinyl plastisol or rubber latex bath, coating the mold with these materials when the mold is withdrawn from the bath. In the case of the vinyl plastisol fusing it by the application of heat or in the case of the latex to cure the latex by post application of accelerators and or curatives or combinations of these chemicals compounded into latex and heating the same. In the uncured or unfused state respectively, a flock of chopped fiber may be applied onto the plastisol or latex on the mold. Subsequently when fused or cured the flock forms a lining which will add to the ease of donning and wearing the gloves. When either the vinyl plastisol or rubber latex material is fused or cured to its final elastomeric state, the glove may easily be inflated with air and blown off the mold simultaneously turning it inside out thereby placing the treated chafing or rubbing surface and liquid cleansing reservoir on the outside and the adhered flock on the inside of the glove.

Alternatively the glove with extended sleevelet and treated cleansing solution reservoir may conveniently be blow molded or injection blow molded utilizing thermoplastic elastomers as the material of manufacture. Since these processes utilize exterior molds, the teat pattern is cut into the inner surface of the molds. In this instance the molten thermoplastic elastomer is forced into closed cooled molds with air pressure, the thermoplastic elastomer is cooled to return to its solid elastomer state and the mold opened and the formed glove removed.

Gloves molded in this fashion may also have a flock applied to the interior. However, this requires the additional steps of turning the gloves inside out, placing these on a mandrel, spraying an adhesive coating on the interior of the glove, spraying with fiber flock, curing the adhesive and finally removing the flocked glove from the mandrel and turning the glove right side out.

In addition to the other embodiments, the glove with extended sleevelet may have a simple loop incorporated into its upper edge. This loop acting to provide a means for hanging of the glove for drying and also may be useful to fasten the glove to a shirt or blouse sleeve by looping it over a button appropriately installed on the sleeve.

The glove with extended sleevelet may also have decorative areas formed by embossing the molds with decorative designs in the appropriate location transferring the decorative design to the glove with extended sleevelet during the dipping or molding operation.

DESCRIPTION OF THE DRAWING

FIG. 1 Glove with extended sleevelet palm view
FIG. 2 Teats with detergent menisci side view
FIG. 3 Distorted teats with detergent released
FIG. 4 Glove with decorative pattern back of hand view.

DETAILED DESCRIPTION

FIG. 1 illustrates the palm side of the glove 10 with extended sleevelet 12 which has loop fastening means 16 affixed immediately at the uppermost edge of the sleevelet. The hook fastening means is affixed 1.5 (3.81 cm) to 2 inches (5.08 cm) along the glove sleevelet in alignment with the loop fastening portion. When the upper portion is folded over the hook and loop fastening means interlock to form a sturdy cuff 32 which will only release on separation of the hook and loop fastening means. Palm and inner finger areas 18 are covered with molded or formed teats 20 FIG. 2 which are 0.62 to 0.125 inch (1.6 mm–3.2 mm) long but preferably 0.100 to 0.125 inch (2.53 mm to 3.2 mm) long. The teats are located on center in relationship to each other to provide a spacing of no more than 0.0313 inch (0.08 mm) between teats. Cleansing solution 22 flows into the interstices 24 formed by the teats to form menisci 22 thereby retaining the cleansing solution by virtue of its surface tension. When the spacial relationship of the teats is changed 26 FIG. 3 by pressing action when rubbing or chafing the article that is being cleaned the liquid cleanser flows out of the interstices between the teats and onto the article being cleansed.

An additional useful embodiment is a decorative pattern 34 that may be placed on the back side of the glove. Such decorative pattern may be useful to segregate gloves for different cleansing chores, for example the pattern may be in the shape of a bathtub to designate use in the bathroom or a tea kettle for use in the kitchen or an auto to designate use with oil and grease in a garage area. Such decorative patterns will be particularly useful in industrial use such as in the handling of highly acidic or caustic electroplating solutions wherein cross contamination must be avoided at all cost.

Glove with extended sleeve also has a loop 8 incorporated into its uppermost edge. The purpose of this loop is twofold, first as a sensible means to hang the gloves to insure drainage of cleansing solution; secondly the loop is useful to fasten the extended sleeve to other articles of clothing to insure that the sleeve will not roll down the arm of the wearer thus exposing the arm to possible contact and subsequent injury with harsh materials that may be in the environment where the gloves are used.

While it has been described the preferred embodiment of the instant invention it will be understood that the invention and method of manufacture may be embodied otherwise as herein specifically illustrated and described and that within said embodiment certain changes in the detail and construction, the form and arrangement of the parts and method of manufacture may be made without departing from the underlying idea or principals of the instant invention within the scope of the appended claims.

What I claim is:

1. A flexible waterproof glove with extended sleevelet which extends over the elbow to mid upper arm of the wearer comprising a plurality of areas on each of the five fingers and palm, said areas containing a symmetrically spacial arrangement of teats, said teats having a maximum diameter of 0.0625 inch (1.6 mm) and a maximum length of 0.125 inch (3.22 mm), said teats being spaced no further than 0.0313 inch apart from adjacent teats to provide a reservoir for cleansing solutions; the surface tension of said cleansing solutions forming menisci between said teats to contain said cleansing solution until said symmetrical spacial relationship of said teats to each other is disturbed by rubbing on an article to be cleansed, thereby breaking the menisci and releasing cleansing solution on the article to be cleansed.

2. A glove with extended sleevelet of claim 1 which has releasable hook and loop fastening means affixed to the uppermost edge of said sleevelet, the loop portion of said hook and loop fastening means is affixed immediately at the uppermost outer edge of said sleevelet, the hook portion is affixed on the outer side of the sleevelet 1.5 inch (3.81 cm) from the uppermost edge of the sleevelet in alignment with said loop portion to provide a fastening means to form a locked releasable cuff when the uppermost edge of said sleevelet is folded over, said loop and hook fastening means interlocking to prevent said cuff from unrolling, said hook portion of the hook and loop fastening means is also available to interlock with said loop portion which is appropriately affixed to a sleeve of a wearer to attach said glove and extended sleevelet to said wearer's sleeve.

3. A glove and extends sleevelet of claim 1 which has a loop incorporated into its upper edge, said loop acting to provide a hanging means and a method of fastening said extended sleevelet to a wearer's sleeve by looping said loop over an appropriately installed button on the wearer's sleeve.

4. A method of manufacture for said glove and extended sleevelet of claim 1 which comprises the dipping of a glove shaped mold which has the teat patterns cut into its surface into a flexible vinyl plastisol bath, withdrawing the same to coat the mold with a layer of vinyl plastisol said vinyl plastisol coated mold being exposed to heat to fuse said vinyl plastisol coating into its final solid elastomeric state, removing said fused vinyl plastisol from the mold by inflating, blowing and simultaneously turning said fused vinyl plastisol glove and extended sleevelet inside out.

5. A glove manufactured according to claim 4 wherein a fiber flock is applied to the vinyl plastisol coated mold prior to fusing the vinyl plastisol said fiber flock forming an easily donnable fiber coating to the interior of said glove when fused and removed from the mold by inflation and turning said fused elastomer and fiber flock coating inside out.

6. A method of manufacture for said glove and extended sleevelet of claim 1 which comprises the dipping of a glove shaped mold which has the teat pattern cut into its surface into a rubber latex bath, withdrawing said mold from said bath to coat the mold with a layer of uncured rubber latex, said rubber coated mold being exposed to rubber accelerators, curatives and heat to cure said rubber latex into its final solid elastomeric state, removing said cured rubber latex coating from said mold by inflating or blowing said inflated coating off the mold and simultaneously turning said cured rubber latex glove inside out.

7. A glove manufactured according to claim 6 wherein fiber flock is applied to the latex rubber coated mold prior to curing the rubber latex, said fiber flock forming an easily donnable fiber coating to the interior of said glove when cured and removed from the mold by inflation and turning said cured elastomer and fiber flock coating inside out.

8. A glove of claim 1 which is manufactured by blow molding a molten thermoplastic elastomer into a cooled mold with the appropriate teat patterns cut into the inner surface of the mold, said heated thermoplastic elastomer being forced into conformity of said mold with air pressure, said thermoplastic elastomer being cooled by the mold to regain its solid elastomeric properties prior to the mold being opened and said glove removed.

9. A glove of claim 1 which is manufactured by injection blow molding a heated thermoplastic elastomer into a cooled mold with the teat patterns cut into the inner surface of the mold, said heated thermoplastic elastomer being forced into conformity of said mold with air pressure, said thermoplastic elastomer being cooled by the mold to regain its solid elastomeric properties prior to the mold being opened and said glove removed.

* * * * *